United States Patent Office 2,715,122
Patented Aug. 9, 1955

2,715,122

EXTRACTION OF SAPONINS FROM YUCCA BACCATA

Edward S. Rothman, Philadelphia, and Monroe E. Wall, Oreland, Pa., assignors to the United States of America as represented by the Secretary of Agriculture No Drawing. Application September 5, 1952,
Serial No. 308,174

3 Claims. (Cl. 260—210.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to and has among its objects the isolation of steroidal saponin, from plant materials, particularly *Yucca baccata*, in a relatively pure state.

Steroidal saponin is of particular interest since some of the steroids found in such saponins may be useful in the synthesis of cortisone and other physiologically active substances.

In practice, the invention is applied as follows:

A solution containing the saponin is first prepared by extracting the fresh or dehydrated plant material with hot water or hot aqueous methanol, ethanol, or isopropanol.

The extract containing the saponin is then extracted with a water-immiscible fat solvent such as benzene, chloroform, diethyl ether, or petrolium ether in order to remove lipids, pigments and in general all fat-soluble impurities. In this extraction the saponin remains in the aqueous phase.

The aqueous phase from which fat-soluble impurities have been removed is subjected to extraction with a water-immiscible polar solvent which has good solvency for the saponin. The water-immiscible alcohols having from 4 to 6 carbon atoms, for example, butyl, amyl, hexyl and cyclohexyl alcohols are preferred. In this extraction various impurities such as proteins, carbohydrates, and alkali salts of various acid compounds remain in the aqueous phase, the saponin being transferred to the solvent phase.

The solvent extract containing the saponin is then treated to precipitate the saponin to separate it from the alcohol phase. This can be accomplished in various ways, for example by cooling, by dehydrating the solvent extract, or by adding an organic solvent which is miscible with the alcohol solvent but in which the saponin is insoluble. Suitable precipitating solvents are, for example, diethyl ether, petroleum ether, acetone, and chloroform.

The saponin thus obtained often has a purity of 50–75%. Further purification may be secured by repeated crystallization from 100% methanol or ethanol or mixtures of these solvents with chloroform.

The following example further illustrates this invention.

Twenty pounds of fresh *Yucca baccata* leaves were extracted with a total of 20 gallons of 95% ethyl alcohol. The aqueous alcoholic extract was concentrated to 1 gallon and exhaustively extracted with ½ gallon benzene in a continuous liquid-liquid extractor. The benzene extract containing pigments and lipids was discarded. The residual aqueous extract was concentrated to a volume of ½ gallon. It was extracted four times with ½ gallon of N-butanol at each extraction. The butanol extract was washed with water and all the aqueous liquors discarded. The butanol was dried over anhydrous sodium sulfate and concentrated to a point just short of precipitation of solids. On adding an excess of diethyl ether, 40 grams of purified saponin precipitated in the form of a light brown powder.

Further purification of this product by recrystallization from absolute n-butanol and/or Soxhlet extraction with absolute methanol followed by precipitation with a non solvent such as hexane, acetone or ether, resulted in a white, microcrystalline, homogeneous saponin.

Having thus described our invention, we claim:

1. A process for isolating steroidal saponin comprising subjecting a substantially aqueous saponin-containing extract of *Yucca baccata* leaves to extraction with benzene, whereby to remove impurities while retaining the saponin in the aqueous phase; then extracting the aqueous phase with a water-immiscible alcohol having 4 to 6 carbon atoms, whereby to obtain an alcohol phase containing the saponin, and separating the saponin from this alcohol phase.

2. A process as in claim 1 wherein the alcohol is butanol.

3. A process for isolating steroidal saponin from *Yucca baccata* leaves comprising extracting the leaves with ethanol containing about 5% of water, whereby to form a saponin-containing liquid phase; evaporating most of the solvent from said liquid phase, whereby to form a substantially aqueous saponin-containing concentrate, extracting said concentrate with benzene, whereby to remove impurities while retaining the saponin in the aqueous phase, extracting this aqueous phase with butanol, whereby to form a butanol phase containing the saponin, and separating the saponin from the butanol phase.

References Cited in the file of this patent

UNITED STATES PATENTS

| 763,003 | Kobert | June 21, 1904 |
| 1,586,116 | Rahn | May 25, 1926 |
| 2,557,916 | Rosen et al. | June 19, 1951 |

OTHER REFERENCES

Wall et al., J. Biol. Chem., 198, 533–4 (1952).